(12) United States Patent
Diehl et al.

(10) Patent No.: US 10,732,268 B1
(45) Date of Patent: Aug. 4, 2020

(54) SYSTEMS AND METHODS FOR ENCLOSURE ALIGNMENT

(71) Applicant: Pony AI Inc., Grand Cayman (KY)

(72) Inventors: Peter G. Diehl, Shanghai (CN); Cheng Jin, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/418,840

(22) Filed: May 21, 2019

(51) Int. Cl.
*G01S 17/87* (2020.01)
*G01S 7/497* (2006.01)
(Continued)

(52) U.S. Cl.
CPC .......... *G01S 7/4972* (2013.01); *G01S 7/4813* (2013.01); *G01S 17/87* (2013.01); *G01S 17/931* (2020.01)

(58) Field of Classification Search
CPC ............ G01B 11/2755; G01B 2210/12; G01B 11/272; G01B 11/026; G01B 11/2513; G01B 11/26; G01B 15/00; G01B 2290/30; G01B 9/02; G01B 9/02098; G01N 1/04; G01N 21/17; G01N 2203/0087; G01N 2203/0089; G01N 2291/2623; G01N 29/265; G01N 33/49; G01N 35/04; G01N 3/08; G01N 2021/7786; G01N 21/77; G01N 21/84; G01N 21/956; G01N 2203/0676; G01N 2223/40; G01N 2223/646; G01N 2291/2694; G01N 23/00; G01N 23/04; G01N 23/044; G01N 23/046; G01N 29/04; G01N 29/225; G01N 29/2493; G01N 29/44; G01N 31/22; G01N 33/0036; G01N 3/56; G01N 33/02; G01N 2015/1006; G01N 33/5308; G01N 33/54366; G01N 15/1434; G01N 15/1459; G01N 2015/149; G01N 21/53; G01N 35/00732; G01N 15/06; G01N 15/147; G01N 2015/0693; G01N 2015/1452; G01N 2035/0436; G01N 21/78; G01N 2800/104; G01N 2800/52; G01N 33/564; G01N 33/6863; G01N 15/1436; G01N 2021/1765; G01N 2035/00138; G01N 2035/00772; G01N 2035/00801; G01N 2035/103; G01N 21/05; G01N 33/94; G01N 35/00; G01N 35/00029; G01N 35/00623; G01N 15/1404; G01N 15/1463; G01N 1/312; G01N 2015/144; G01N 2015/1481; G01N 2015/1493;
(Continued)

(56) References Cited

U.S. PATENT DOCUMENTS

| 5,947,051 A | 9/1999 | Geiger | |
|---|---|---|---|
| 2015/0021466 A1* | 1/2015 | Bibl | B25J 15/0085 250/231.1 |

(Continued)

*Primary Examiner* — Michael P Stafira
(74) *Attorney, Agent, or Firm* — Sheppard Mullin Richter & Hampton LLP

(57) ABSTRACT

Systems and methods are provided for enclosure alignment. A light can be emitted from a light source. The light source can be integrated into an enclosure to be aligned onto a fixture. A light detector can detect the light emitted by the light source. A luminance of the light detected by the light detector can be measured. Based on the luminance, an extent of an alignment of the enclosure with respect to the fixture can be determined. The enclosure can be translated along the fixture based on the extent of the alignment.

20 Claims, 8 Drawing Sheets

(51) Int. Cl.
*G01S 7/481* (2006.01)
*G01S 17/931* (2020.01)

(58) Field of Classification Search
CPC ... G01N 2021/1714; G01N 2021/4735; G01N 2021/6421; G01N 2021/6482; G01N 2021/8411; G01N 2021/8618; G01N 2030/009; G01N 2030/8827; G01N 2035/00039; G01N 2035/00049; G01N 2035/00079; G01N 2035/00277; G01N 2035/00306; G01N 2035/00356; G01N 2035/00475; G01N 2035/00643; G01N 2035/00851; G01N 2035/0405; G01N 2035/0406; G01N 2035/0449; G01N 2035/0465; G01N 2035/0467; G01N 2035/0493; G01N 2035/1025; G01N 2035/1053; G01N 21/171; G01N 21/253; G01N 21/27; G01N 21/474; G01N 21/59; G01N 21/63; G01N 21/645; G01N 21/6452; G01N 21/81; G01N 21/8422; G01N 21/8483; G01N 21/86; G01N 21/896; G01N 2201/0245; G01N 2201/0632; G01N 2201/065; G01N 2201/0697; G01N 2570/00; G01N 30/467; G01N 30/6091; G01N 33/15; G01N 33/48792; G01N 33/4972; G01N 33/54373; G01N 33/54386; G01N 33/6842; G01N 33/9446; G01N 35/00693; G01N 35/00871; G01N 35/025; G01N 35/028; G01N 35/10; G01N 35/1011; G01N 35/109; G02B 17/08; G02B 26/0833; G02B 27/0068; G02B 5/0891; G02B 5/09; G02B 7/09; G02B 7/182; G02B 7/004; G02B 21/0008; G02B 7/003; G02B 13/16; G02B 27/106; G02B 27/126; G02B 21/16; G02B 21/34; G02B 27/30; G02B 6/0096; G02B 19/0028; G02B 19/0061; G02B 21/0088; G02B 21/365; G02B 27/0927; G02B 27/095; G02B 27/0977; G02B 27/28; G02B 27/62; G02B 5/1814; G02B 5/3016; G02B 7/022; G02B 7/025; G02B 7/36
See application file for complete search history.

(56) References Cited

U.S. PATENT DOCUMENTS

| 2018/0058884 | A1* | 3/2018 | Rees | G01B 11/007 |
| 2018/0329066 | A1* | 11/2018 | Pacala | G01S 7/4813 |
| 2019/0120939 | A1 | 4/2019 | O'Keeffe | |
| 2019/0179028 | A1* | 6/2019 | Pacala | G01S 17/10 |

* cited by examiner

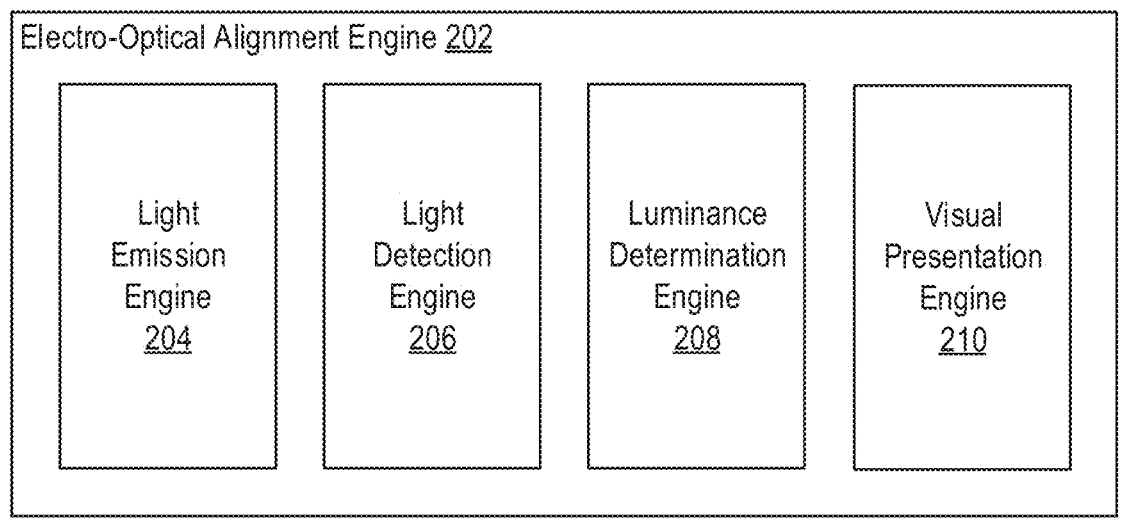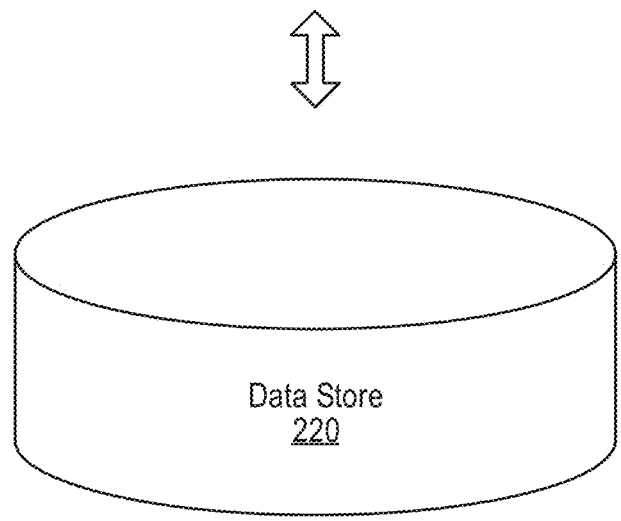
FIG. 2

500

```
┌─────────────────────────────────────────────────────────────────────┐
│ Emit a light from a light source, the light source integrated into  │
│ an enclosure to be aligned onto a fixture                           │
│                              502                                    │
└─────────────────────────────────────────────────────────────────────┘
                                 │
                                 ▼
┌─────────────────────────────────────────────────────────────────────┐
│              Detect the light by a light detector                   │
│                              504                                    │
└─────────────────────────────────────────────────────────────────────┘
                                 │
                                 ▼
┌─────────────────────────────────────────────────────────────────────┐
│         Measure a luminance of the light detected by the light detector │
│                              506                                    │
└─────────────────────────────────────────────────────────────────────┘
                                 │
                                 ▼
┌─────────────────────────────────────────────────────────────────────┐
│ Determine, based on the luminance of the light, an extent of an     │
│ alignment of the enclosure to the fixture                           │
│                              508                                    │
└─────────────────────────────────────────────────────────────────────┘
                                 │
                                 ▼
┌─────────────────────────────────────────────────────────────────────┐
│ Translate the enclosure along the fixture based on the extent of    │
│ the alignment                                                       │
│                              510                                    │
└─────────────────────────────────────────────────────────────────────┘
```

FIG. 5

SYSTEMS AND METHODS FOR ENCLOSURE ALIGNMENT

FIELD OF THE INVENTION

This disclosure relates to enclosure alignment on a fixture. More particularly, this disclosure relates to systems and methods for alignment of a sensor enclosure to a fixture mounted on an autonomous vehicle.

BACKGROUND

In general, a vehicle (e.g., an autonomous vehicle, a driverless vehicle, etc.) can have myriad sensors onboard the vehicle. For example, the myriad sensors can include light detection and ranging sensors (or LiDARs), radars, cameras, etc. The myriad sensors can play a central role in functioning of an autonomous or driverless vehicle. For example, LiDARs can be utilized to detect and identify objects (e.g., other vehicles, road signs, pedestrians, buildings, etc.) in a surrounding. LiDARs can also be utilized to determine relative distances of the objects in the surrounding. For another example, radars can be utilized to aid with collision avoidance, adaptive cruise control, blind side detection, etc. For yet another example, cameras can be utilized to recognize, interpret, and/or analyze contents or visual cues of the objects. Data collected from these sensors can then be processed and used, as inputs, to make driving decisions. The myriad sensors can be replaced with replacement sensors or, in some cases, moved from one vehicle to another vehicle.

SUMMARY

Various embodiments of the present disclosure can include systems and methods configured to emit a light from a light source. The light source can be integrated into an enclosure to be aligned to a fixture. The light can be detected by a light detector. A luminance of the light detected by the light detector can be measured. Based on the luminance, an extent of an alignment of the enclosure with respect to the fixture can be determined. The enclosure can be translated along the fixture based on the extent of the alignment.

In some embodiments, the enclosure can be translated along the fixture in a direction.

In some embodiments, a visual indication of the extent of the alignment of the enclosure can be provided.

In some embodiments, the light can reflect off from a reflective surface in the fixture, and the light detector can be integrated into the enclosure.

In some embodiments, the light can be directly detected by the light detector, and the light detector can be integrated into the fixture.

In some embodiments, the luminance of the light can be measured as a function of linear distance of the enclosure with respect to the fixture. A maximum luminance of the light corresponding to a particular linear distance of the enclosure can be determined. The particular linear distance can be identified as an optimal alignment position for the enclosure with respect to the fixture.

In some embodiments, the light emitted by the light source can be a coherent light.

In some embodiments, the light source can be a laser diode.

In some embodiments, the light emitted by the light source can be a visible light.

In some embodiments, the light source can be a light emitting diode.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2 illustrates an example enclosure alignment system, according to an embodiment of the present disclosure.

FIG. 5 illustrates an example method, according to an embodiment of the present disclosure.

Figure 1A:
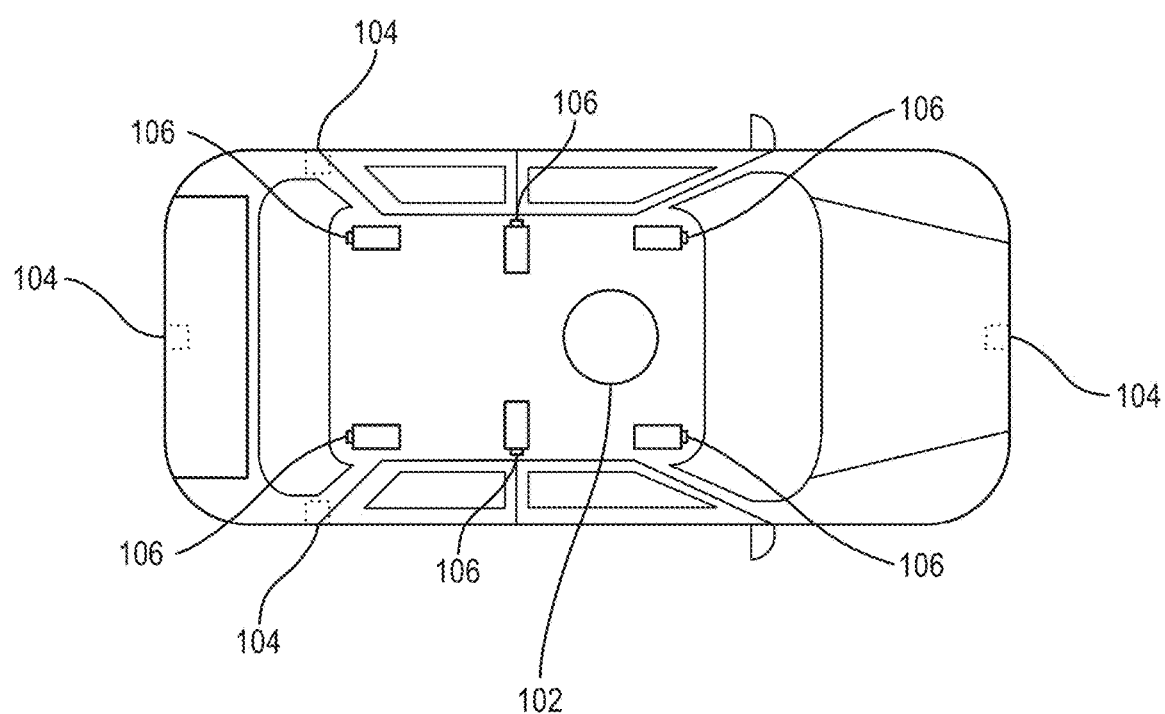
FIG. 1A illustrates an example autonomous vehicle, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

In general, a vehicle (e.g., an autonomous vehicle, a driverless vehicle, etc.) can have myriad sensors onboard the vehicle. The myriad sensors can include light detection and ranging sensors (or LiDARs), radars, cameras, GPS, sonar, ultrasonic, IMU (inertial measurement unit), accelerometers, gyroscopes, magnetometers, FIR (far infrared) sensors, etc. The myriad sensors can play a central role in functioning of an autonomous or driverless vehicle. For example, LiDARs can be utilized to detect and identify objects (e.g., other vehicles, road signs, pedestrians, buildings, etc.) in a surrounding. LiDARs can also be utilized to determine relative distances of the objects in the surrounding. For another example, radars can be utilized to aid with collision avoidance, adaptive cruise control, blind side detection, assisted parking, etc. For yet another example, camera can be utilized to recognize, interpret, and/or analyze contents or visual cues of the objects. Cameras and other optical sensors can capture image data using charge coupled devices (CCDs), complementary metal oxide semiconductors (CMOS), or similar elements. An IMU may detect abnormal occurrences such as a bump or pothole in a road. Data collected from these sensors can then be processed and used, as inputs, to make driving decisions (e.g., acceleration, deceleration, direction change, etc.). For example, data from these sensors may be further processed into an image histogram of a graphical representation of tonal distribution in an image captured by the one or more sensors.

In general, sensors onboard an autonomous vehicle must be aligned, meaning that the sensors must be placed at specific or particular locations on the autonomous vehicle such that data collected from the sensors is reliable to make driving decisions. For example, a LiDAR relies on speed of light and position of lasers beams to determine relative distances and locations of objects in a three dimensional surrounding. Data collected by the LiDAR, therefore, is highly dependent (or calibrated) to a specific location to which the LiDAR is located. Depending on where the LiDAR is located, the distances and the locations of the objects as determined by the LiDAR can vary. For example, time it takes for a reflected light to reach a LiDAR located in a front of the autonomous vehicle will be different from time it takes for the same reflected light to reach a LiDAR located in a back of the autonomous vehicle. This slight time difference, in some cases, can make the distance and the location determination no longer reliable for use in guiding the autonomous vehicle. Therefore, under conventional approaches, to replace sensors or to move sensors from one vehicle to another vehicle, each sensor must go through a lengthy alignment process to ensure that the sensors are placed correctly, calibrations associated with the sensors are not disrupted, and the data collected from the sensors remains reliable for use. Accordingly, replacing sensors or moving sensors from one vehicle to another vehicle can be laborious, time consuming, cumbersome, and inefficient.

Various embodiments overcome problems specifically arising in the realm of autonomous vehicle technology. In various embodiments, the myriad sensors (e.g., LiDARs, radars, cameras, etc.) onboard the autonomous vehicle can be encased or housed in an enclosure. The enclosure allows the myriad sensors to be moved from one vehicle to another vehicle in a single act, rather than to move the myriad sensors one by one. In some embodiments, the enclosure can be installed or mounted onto a fixture of the autonomous vehicle. For example, the enclosure can be installed or mounted onto a roof rack or a custom rack fitted to the autonomous vehicle. The enclosure can be translated or moved along the fixture. In some embodiments, the enclosure is made of a material that is transparent to electromagnetic waves receptive to the myriad sensors encased by the enclosure. For example, the enclosure can be made from a transparent material that allows laser lights, radio waves, and visible lights emitted and/or received by the LiDARs, the radars, and the cameras, respectively, to enter and/or exit the enclosure. In some embodiments, the enclosure can include a light source. The light source can emit a light. This light can be received or detected by a light detector. In some cases, the light can be reflected before being received or detected by the light detector. In one embodiment, both the light source and the light detector are integrated into the enclosure. In another embodiment, the light source is integrated into the enclosure while the light detector is integrated into the fixture of the autonomous vehicle. A luminance of the light can be determined. Based on the luminance of the light, a determination on whether the enclosure has been properly aligned (positioned or placed) onto the fixture of the autonomous vehicle can be made. Various embodiments are discussed herein in greater detail.

FIG. 1A illustrates an example autonomous vehicle 100, according to an embodiment of the present disclosure. An autonomous vehicle 100 generally refers to a category of vehicles that are capable of sensing and driving in a surrounding by itself. The autonomous vehicle 100 can include myriad sensors (e.g., LiDARs, radars, cameras, etc.) to detect and identify objects in the surrounding. Such objects may include, but not limited to, pedestrians, road signs, traffic lights, and/or other vehicles, for example. The autonomous vehicle 100 can also include myriad actuators to propel and navigate the autonomous vehicle 100 in the surrounding. Such actuators may include, for example, any suitable electro-mechanical devices or systems to control a throttle response, a braking action, a steering action, etc. In some embodiments, the autonomous vehicle 100 can recognize, interpret, and analyze road signs (e.g., speed limit, school zone, construction zone, etc.) and traffic lights (e.g., red light, yellow light, green light, flashing red light, etc.). For example, the autonomous vehicle 100 can adjust vehicle speed based on speed limit signs posted on roadways. In some embodiments, the autonomous vehicle 100 can determine and adjust speed at which the autonomous vehicle 100 is traveling in relation to other objects in the surrounding. For example, the autonomous vehicle 100 can maintain a constant, safe distance from a vehicle ahead (e.g., adaptive cruise control). In this example, the autonomous vehicle 100 maintains this safe distance by constantly adjusting its vehicle speed to that of the vehicle ahead.

In various embodiments, the autonomous vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the autonomous vehicle 100 can effectuate any control to itself that a human driver can on a conventional vehicle. For example, the autonomous vehicle 100 can accelerate, brake, turn left or right, or drive in a reverse direction just as a human driver can on the conventional vehicle. The autonomous vehicle 100 can also sense environmental conditions, gauge spatial relationships (e.g., distances between objects and itself), detect and analyze road signs just as the human driver. Moreover, the autonomous vehicle 100 can perform more complex operations, such as parallel parking, parking in a crowded parking lot, collision avoidance, etc., without any human input.

In various embodiments, the autonomous vehicle 100 may include one or more sensors. As used herein, the one or more sensors may include a LiDAR 102, radars 104, cameras 106, and/or the like. The one or more sensors allow the autonomous vehicle 100 to sense a surrounding around the autonomous vehicle 100. For example, the LiDARs 102 can be configured to generate a three-dimensional map of the surrounding. The LiDARs 102 can also be configured to detect objects in the surrounding. For another example, the radars 104 can be configured to determine distances and speeds of objects around the autonomous vehicle 100. For yet another example, the cameras 106 can be configured to capture and process image data to detect and identify objects, such as road signs, as well as analyzing content of the objects, such as speed limit posted on the road signs.

In the example of FIG. 1A, the autonomous vehicle 100 is shown with the LiDAR 102 mounted to a roof or a top of the autonomous vehicle 100. The LiDAR 102 can be configured to generate three dimensional maps and detect objects in the surrounding. In the example of FIG. 1A, the autonomous vehicle 100 is shown with four radars 104. Two radars are directed to a front-side and a back-side of the autonomous vehicle 100, and two radars are directed to a right-side and a left-side of the autonomous vehicle 100. In some embodiments, the front-side and the back-side radars can be configured for adaptive cruise control and/or accident avoidance. For example, the front-side radar can be used by the autonomous vehicle 100 to maintain a safe distance from a vehicle ahead of the autonomous vehicle 100. For another example, if the vehicle ahead experiences a sudden reduction in speed, the autonomous vehicle 100 can detect this sudden change in motion, using the front-side radar, and adjust its vehicle speed accordingly. In some embodiments, the right-side and the left-side radars can be configured for blind-spot detection. In the example of FIG. 1A, the autonomous vehicle 100 is shown with six cameras 106. Two cameras are directed to the front-side of the autonomous vehicle 100, two cameras are directed to the back-side of the autonomous vehicle 100, and two cameras are directed to the right-side and the left-side of the autonomous vehicle 100. In some embodiments, the front-side and the back-side cameras can be configured to detect, identify, and determine objects, such as cars, pedestrian, road signs, in the front and the back of the autonomous vehicle 100. For example, the front-side cameras can be utilized by the autonomous vehicle 100 to identify and determine speed limits. In some embodiments, the right-side and the left-side cameras can be configured to detect objects, such as lane markers. For example, side cameras can be used by the autonomous vehicle 100 to ensure that the autonomous vehicle 100 drives within its lane.

Figure 1B:
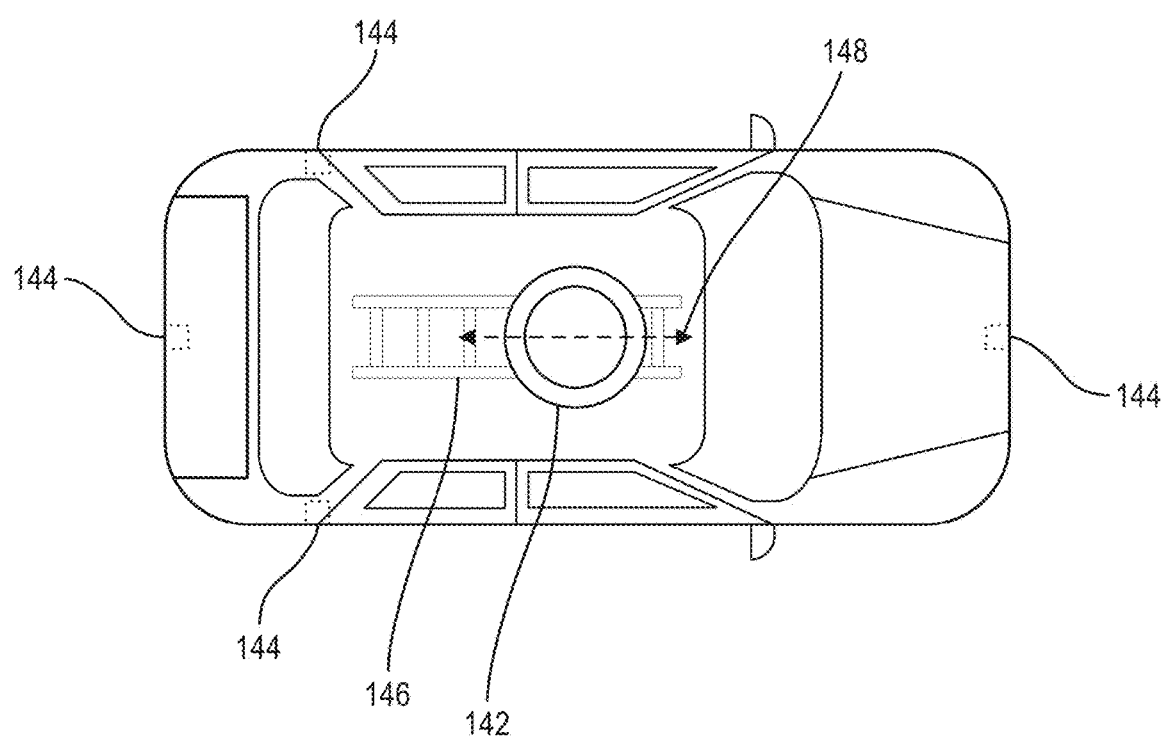
FIG. 1B illustrates an example autonomous vehicle, according to an embodiment of the present disclosure.

FIG. 1B illustrates an example autonomous vehicle 140, according to an embodiment of the present disclosure. In the example of FIG. 1B, the autonomous vehicle 140 is shown with an enclosure 142 and four radars 144. The enclosure 142 is mounted onto a fixture 146. In some embodiments, the fixture 146 can be a roof rack or a custom rack fitted to the autonomous vehicle 140. The enclosure 142, when mounted onto the fixture 146, can translate along a linear axis 148. For example, once mounted onto the fixture 146, the enclosure 142 can be adjusted to move in a forward or a backward direction with respect to the autonomous vehicle 140, along the linear axis 148 of the fixture 146. In some embodiments, the enclosure 142 can be adjusted to move along a nonlinear axis. In some embodiments, the enclosure 142 can include a LiDAR, a plurality of radars and cameras, and its associated electronics. In another embodiment, the enclosure 142 can include a LiDAR, a plurality of cameras, and its associated electronics. Many variations are possible. As discussed, the enclosure 142 allows sensors to be packaged compactly or tightly and to be moved from one vehicle to another in a single act, rather than a series of acts which requires moving the sensors one at a time and align each sensor individually thereafter. In various embodiments, the enclosure 142 can made from any materials that are transparent to electromagnetic waves emitted by or receptive to sensors encased in the enclosure 142. For example, the enclosure 142 must be transparent to laser beams emitted and received by the LiDAR inside the enclosure 142. In various embodiments, an outer cover of the enclosure 142 can be made from tempered glass, plexiglass, chemically strengthened glass, and the likes. In some embodiments, the enclosure can include a light source. The light source can emit a light which can be detected by a light detector. A luminance of the light can be determined. As the enclosure 142 translates or moves along the fixture 146, the luminance corresponding to the light received, detected, or seen by the light detector changes. Based on this luminance, a determination of an extent of an alignment of the enclosure 142 with respect to the fixture 146 can be made. For example, when the luminance of the light as detected by the light detector is zero, the enclosure 142 is not aligned to the fixture 146. When the luminance of the light is at or near its maximum value, the enclosure 142 is deemed to be aligned to the fixture 146. Using luminance to determine an extent of an alignment of an enclosure will be discussed in greater detail with respect to FIG. 4 herein.

FIG. 2 illustrates an example enclosure alignment system 200, according to an embodiment of the present disclosure. The enclosure alignment system 200 can include an electro-optical alignment engine 202 that further includes one or more processors and memory. The processors, in conjunction with the memory, can be configured to perform various operations associated with the enclosure alignment system 200. For example, the processors and memory can be used to compute luminance of light. The electro-optical alignment engine 202 can be configured to help align an enclosure (e.g., the enclosure 142 of FIG. 1B) to a fixture (e.g., the fixture 146 of FIG. 1B) using electro-optical sensors and detectors. As shown in FIG. 2, in some embodiments, the electro-optical alignment engine 202 can further include a light emission engine 204, a light detection engine 206, a luminance determination engine 208, and a visual presentation engine 210. The light emission engine 204, the light detection engine 206, the luminance determination engine 208, and the visual presentation engine 210 will be discussed in further detail below.

In some embodiments, the enclosure alignment system 200 can additionally include at least one data store 220 that is accessible to the electro-optical alignment engine 202. In some embodiments, the data store 220 can be configured to store parameters, data, configuration files, or machine-readable codes of the light emission engine 204, the light detection engine 206, the luminance determination engine 208 and the visual presentation engine 210.

The light emission engine 204 can be configured to emit a light to be received or detected by the light detection engine 206. In various embodiments, the light emission engine 204 can include a light source. The light source can be an electro-optical device that converts electricity or electric signal into light or optical signal. In one embodiment, the light source can be a photodiode such as a light emitting diode (LED). In another embodiment, the light source can be a laser diode. In some embodiments, the light emitted by the light source can be either visible or coherent light. For example, if LED is used as the light source, the light emitted, correspondingly, will be visible light. For another example, if laser diode is used as the light source, the light emitted, correspondingly, will be coherent light. In various embodiments, the signal transmitting engine 204 can be integrated into an enclosure (e.g., the enclosure 142 of FIG. 1B).

In some embodiments, the light emission engine 204 can include a reflective surface. The reflective surface can redirect a path of the light emitted by the light source. For example, in an embodiment, the light emitted from the light source can be redirected by or reflected from the reflective surface so that the light can be detected by the light detection engine 206. The light produced by the light source can offset at an angle as measured from the reflective surface. This light (i.e., incident light) hits the reflective surface and is redirected by the reflective surface by that same angle. The light emission engine 204 will be discussed in greater detail with respect to FIG. 3A herein.

The light detection engine 206 can be figured to receive or detect the light emitted from the light emission engine 204. In various embodiments, the light detection engine 206 can include a light detector. The light detector can be an electro-optical device that converts light or optical signal into electricity or electric signal. This electric signal can then be further processed and analyzed by the luminance determination engine 208 to compute a luminance value corresponding to the light received by the light detection engine 206. In general, the light detector used is matched or tuned to be receptive to the light emitted by the light emission engine 204. For example, if a LED light source is used, the light detector is matched or tuned to be most receptive to light emitted by the LED light source. For another example, if a laser diode is used, the light detector is matched or tuned to be most receptive to light (e.g., laser or coherent light) emitted by the laser diode. Tuning of the light detector prevents stray lights (or ambient lights) from skewing luminance computation. In various embodiments, the light detection engine 206 can be integrated into the enclosure. In other embodiments, the light detection engine 206 can in integrated into a fixture of an autonomous vehicle.

The luminance determination engine 208 can be configured to compute or measure a luminance value corresponding to the light received or detected by the light detection engine 206. In general, the luminance determination engine 208 computes luminance as a function of the light received, detected, or seen by the light detector. The light received, detected, or seen by the light detection engine 206 depends on position of the enclosure with respect to the fixture. For example, if the enclosure is not near its final alignment position, the light emitted by the light emission engine 204 will not be not received, detected, or seen by the light detection engine 206. In this example, the luminance determination engine 208 computes or measures the corresponding luminance value to be zero, which, in this case, indicates that the enclosure is not aligned or placed correctly. As the enclosure moves closer to the final alignment position, at some point, the light will be partially received, detected, or seen by the light detection engine 206, and the luminance determination engine 208 computes or measures the luminance value to be some fraction or portion of a maximum luminance value. This luminance value indicates that the enclosure is close to the final alignment position. If the light is fully received, detected, or seen by the light detection engine 206, the luminance determination engine 208 computes or measures the luminance value to be the maximum luminance value. The maximum luminance value indicates that the enclosure is at the final alignment position. In some embodiments, the maximum luminance value can be determined based on historical luminance values. For example, there can be a fleet of autonomous vehicle with each vehicle being exactly the same and having exactly same sensor enclosure and fixture. In this example, because the enclosure's location does not change in relation to the fixture, the location corresponding to the maximum luminance does not change from one autonomous vehicle to another autonomous vehicle. Based on the historical luminance values, the final alignment position can be determined for the whole fleet of autonomous vehicles. In some embodiments, the historical luminance values can be used to detect alignment errors. For example, relative enclosure location in relation to a fixture can be compared with a known enclosure location to identify errors in the enclosure location. The luminance determination engine 208 will be discussed in greater detail with respect to FIG. 4 herein.

The visual presentation engine 210 can be configured to present a visual indication to a user of the enclosure alignment system 200 to indicate that the enclosure is at the final alignment position. In some embodiments, the visual presentation engine 210 can include a display that provide a visual feedback to the user, an extent of an alignment of the enclosure to the fixture. For example, the display can be a computing monitor of a computing device that presents relative position of the enclosure with respect to the fixture. In some embodiments, the visual presentation engine 210 can communicate with a mobile computing device (e.g., a smartphone, tablet, handheld device, etc.) such that the visual indication is presented on a screen of the mobile computing device. Mary variations are possible. In some embodiments, the visual presentation engine 210 can be configured to emits an audio cue to audibly indicate that the enclosure is at the final alignment position. The audio cue can vary based on the luminance value. For example, the audio cue can vary a pitch, and/or an amplitude based on the luminance value. In some embodiments, the audio cue can be discrete (e.g., "beep" sound) or continuous. In some cases, the audio cue can be based on a plurality of sound profiles (e.g., certain audio words or music). Many variations are possible.

Figure 3A:
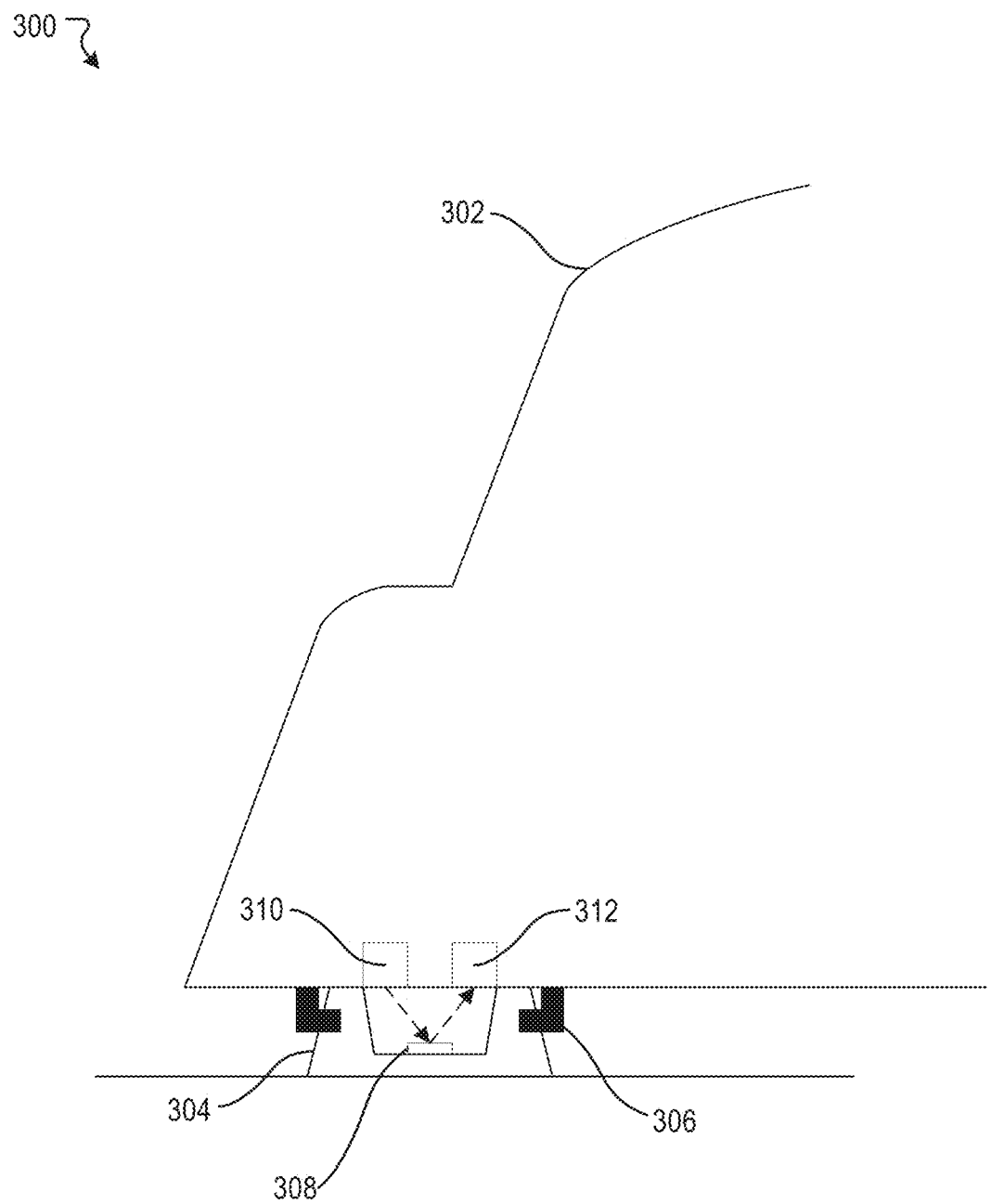
FIG. 3A illustrates a cross-sectional view of an example enclosure alignment system, according to an embodiment of the present disclosure.

FIG. 3A illustrates a cross-sectional view of an example enclosure alignment system 300, according to an embodiment of the present disclosure. In this example, the enclosure alignment system 300 includes an enclosure 302 mounted onto a fixture 304 secured by one or more securing clamps 306. The one or more securing clamps 306 hold the enclosure 302 securely onto the fixture 304. In some embodiments, the enclosure 302 can include a plurality of sensors (e.g., a LiDAR and a plurality of cameras) that are associated with an autonomous vehicle. In some embodiments, the enclosure 302 can be made from materials that are transparent to lights receptive to the plurality of sensors. Once mounted, the enclosure 302 can translate along rails of the fixture 304. In some embodiments, the enclosure 302 can include a light source 310 and a light detector 312. The light source 310 can emit a light that can be received by the light detector 312. In this example, because the light source 310 and the light detector 312 are both integrated into the enclosure 302, the light will not be received by the light detector 314 unless the light is reflected. As such, the enclosure alignment system 300 can further include a reflective surface 308 at a particular location within the rails of the fixture 304. This particular location indicates a final alignment position for which the enclosure 302 is positioned with respect to the fixture 304. This alignment position ensures that calibration associated with the plurality of sensors encased by the enclosure 302 remains intact and thus, data collected by the plurality of sensors can be subsequently processed and analyzed without further calibration. Therefore, as the enclosure 302 is translated along the fixture 304, at some point, the light emitted by the light source 310 will be reflected off from the reflective surface 308 and received by the light detector 312. When this occurs, it is an indication that the enclosure 302 is positioned correctly on the fixture 304, therefore the enclosure 302 is aligned.

Figure 3B:
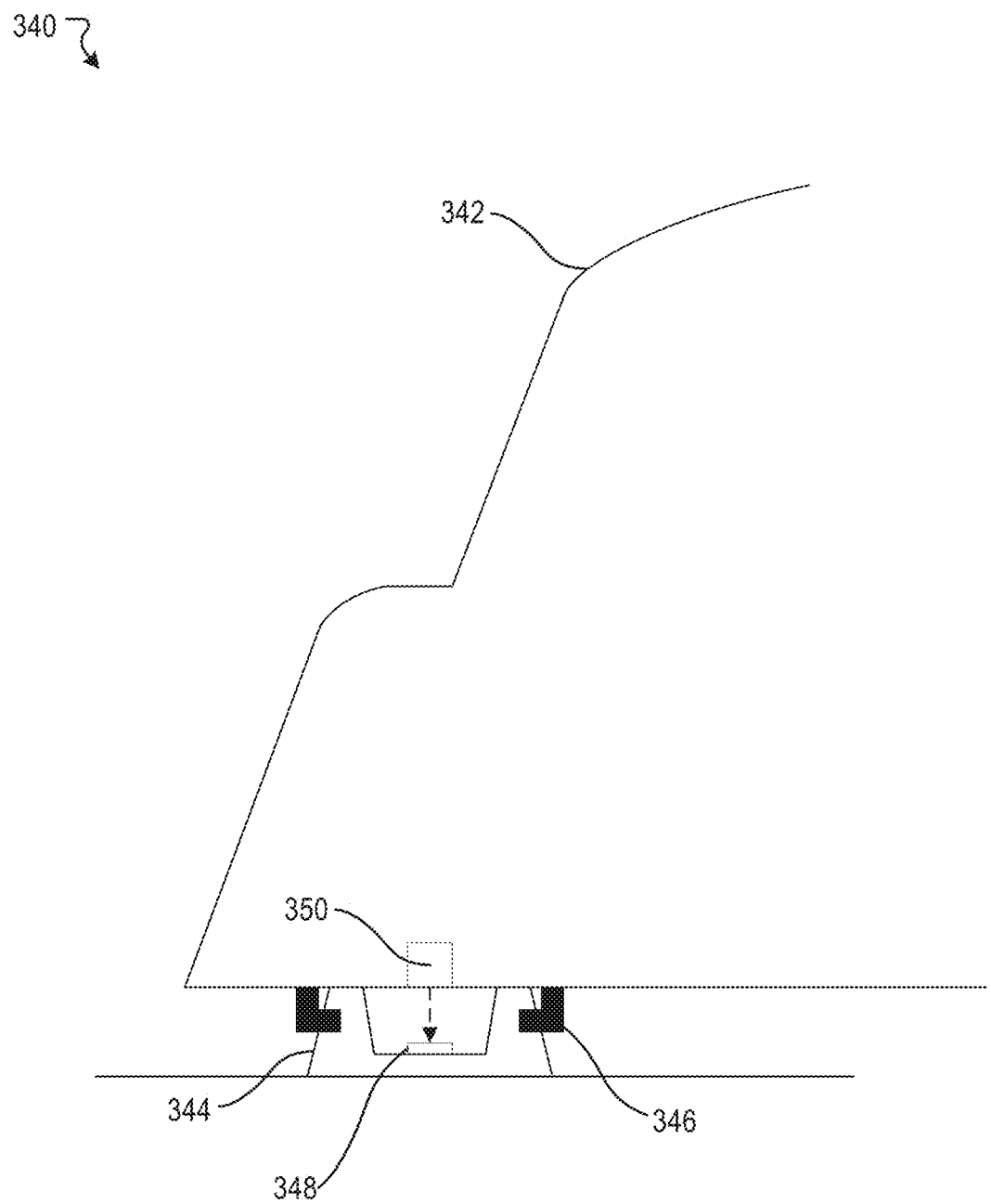
FIG. 3B illustrates a cross-sectional view of an example enclosure alignment system, according to an embodiment of the present disclosure.

FIG. 3B illustrates a cross-sectional view of an example enclosure alignment system 340, according to an embodiment of the present disclosure. In this example, the enclosure alignment system 340 includes an enclosure 342 mounted onto a fixture 344 secured by one or more securing clamps 346. The one or more securing clamps 346 hold the enclosure 342 securely onto the fixture 344. In some embodiments, the enclosure 342 can include a plurality of sensors (e.g., a LiDAR and a plurality of cameras) that are associated with an autonomous vehicle. In some embodiments, the enclosure 342 can be made from materials that are transparent to lights receptive to the plurality of sensors. Once mounted, the enclosure 342 can translate along rails of the fixture 344. In some embodiments, the enclosure alignment system 340 can further include a light detector 348 at a particular location within the rails of the fixture 344. This particular location indicates a final alignment position to which the enclosure 342 is positioned with respect to the fixture 344. This alignment position ensures that calibration associated with the plurality of sensors encased by the enclosure 342 remains intact and thus, data collected by the plurality of sensors can be subsequently processed and analyzed without further calibration. In this example, the enclosure 342 can further include a light source 350. The light source 350 can emit a light that can be received directly (e.g., no reflection or refraction) by the light detector 348. As the enclosure 342 is translated along the fixture 344, at some point, the light emitted by the light source 350 will be received directly by the light detector 348. When this occurs, it is an indication that the enclosure 342 is positioned correctly on the fixture 344, therefore the enclosure 342 is aligned. In another example, the light from the light source 350 may also undergo reflection, refraction, or total internal reflection as the light moves from the light source to the light detector. The light detector 348 may determine whether the light from the light source 350 has undergone reflection, refraction, or total internal reflection based on an incident angle of the light entering the light source 350, a time it takes for the light to arrive at the light source 350, and/or a relative position of the fixture 344.

Figure 4:
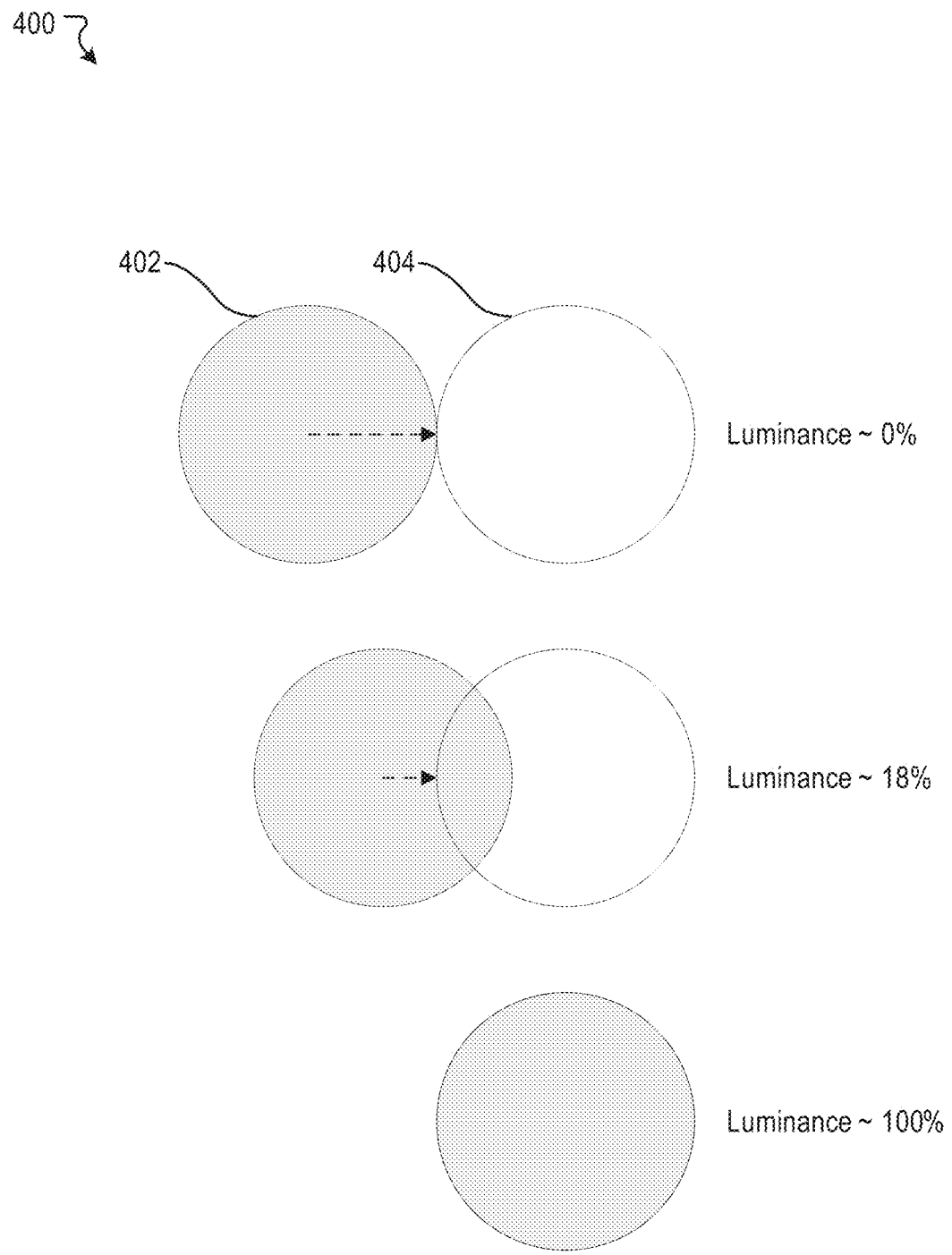
FIG. 4 illustrates an example luminance visual indication scenario, according to an embodiment of the present disclosure.

FIG. 4 illustrates an example luminance visual indication scenario 400, according to an embodiment of the present disclosure. In this example scenario 400, there can be an emitted light 402 from a light source. The emitted light 402 can be received, detected, or seen by a light detector 404. In various embodiments, the light source can be integrated into an enclosure. As the enclosure translates along an axis of a fixture, the emitted light 402 also translates along the axis of the fixture. At some point, during the translation, the emitted light 402 will be received, detected, or seen by the light detector 404. For example, in one implementation, the emitted light 402 can be reflected before being received by the light detector 404 (e.g., the embodiment discussed with respect to FIG. 3A). In another implementation, the emitted light 402 can be directly received by the light detector 404 (e.g., the embodiment discussed with respect to FIG. 3B). Based on this detected light 402, a luminance value can be determined. In this example, a luminance of zero indicates that an alignment of the enclosure with respect to the fixture is still off. A luminance that equals a maximum luminance indicates that the enclosure is perfectly aligned with respect to the fixture. A luminance that has a value between zero and the maximum luminance indicates that the alignment of the enclosure is close to its intended final alignment position. The maximum luminance may be predetermined based on the known luminance of the light source. In some embodiments, the maximum luminance may be dynamically adjusted based on an age or a determined age of the light source. In some embodiments, the maximum luminance may be determined by a profile of a measured luminance of the detected light 402 at the light detector 404, based on or in relation to a position of the fixture and/or a time corresponding to the position of the fixture and the measured luminance. For example, the light source may emit light that is dimmer than its full intensity, for example, because of an age of the light source, or a faulty electrical connection. In that situation, the maximum luminance of the detected light 402 received by the light detector 404 would not be the full intensity of the light source, so the maximum luminance would be determined dynamically as an intensity of the light source itself changes, to provide accurate results. The light detector 404 may also determine a rate of change (e.g., derivative) of the luminance of the detected light 402 from the light source over time to determine the maximum luminance. In another example, the light detector 404 may also determine a rate of change (e.g., derivative) of the luminance of the detected light 402 from the light source over time to determine when the enclosure is perfectly aligned with respect to the fixture. For example, the light detector 404 may determine that the enclosure is perfectly aligned with respect to the fixture when the rate of change (e.g. derivative) of the luminance of the detected light 402 over time, is zero.

FIG. 5 illustrates an example method 500, according to an embodiment of the present disclosure. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, a light can be emitted from a light source, the light source integrated into an enclosure to be mounted onto a fixture. At block 504, the light can be detected by a light detector. At block 506, a luminance of the light detected by the light detector can be measured. At block 508, based on the luminance of the light, an extent of an alignment of the enclosure to the fixture can be determined. At block 510, the enclosure can be translated along the fixture based on the extent of the alignment.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
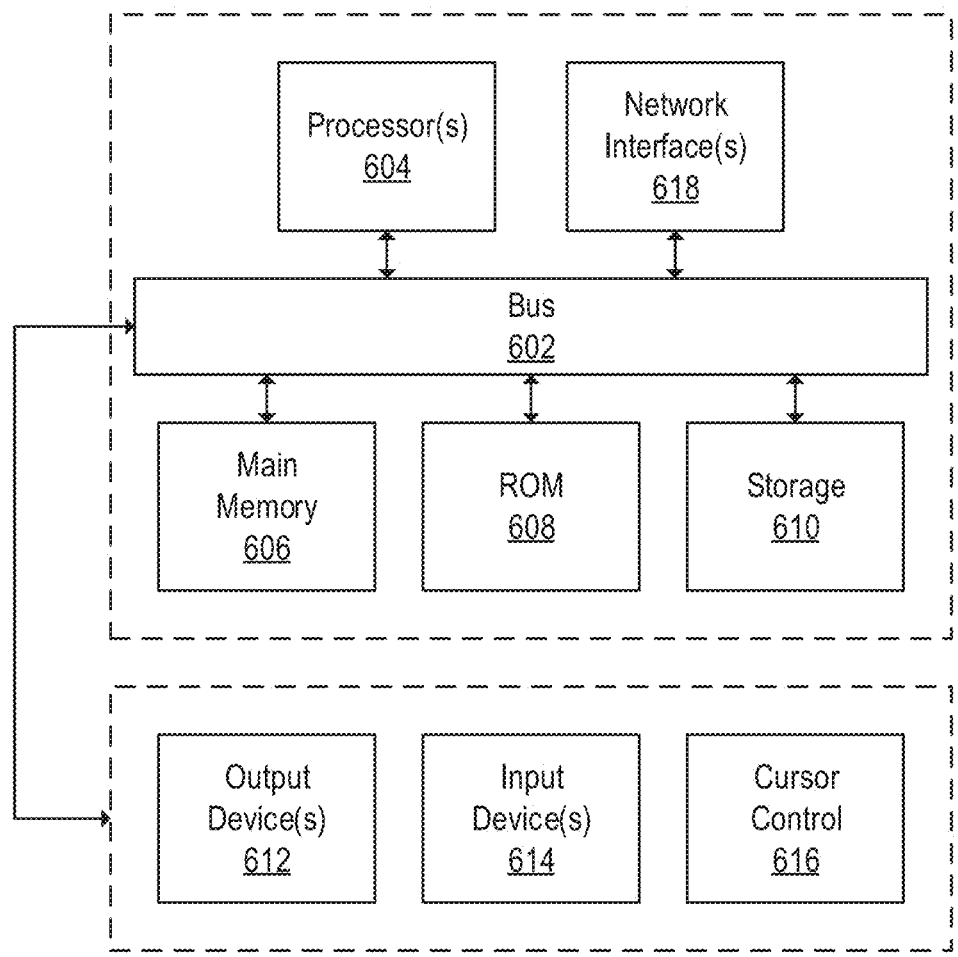
FIG. 6 illustrates a block diagram of a computer system.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms.

Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. An enclosure alignment method comprising:
   emitting light from a light source integrated into an enclosure to be aligned onto a linear fixture;
   detecting the light by a light detector;
   measuring a luminance of the light by the light detector;
   determining, based on the luminance of the light, an extent of an alignment of the enclosure with respect to the linear fixture, wherein the determining comprises:
      measuring the luminance of the light as the enclosure is being linearly translated along the linear fixture;
      determining a maximum luminance of the light corresponding to a particular location on the linear fixture; and
      identifying the particular location as an alignment position for the enclosure with respect to the linear fixture; and
   linearly translating the enclosure along the linear fixture to the alignment position.

2. The method of claim 1, further comprising:
   translating the enclosure along the linear fixture in a linear direction until the alignment position is reached.

3. The method of claim 1, further comprising:
   providing a visual indication of the extent of the alignment of the enclosure.

4. The method of claim 1, wherein the light reflects off from a reflective surface on the linear fixture, the reflective surface on the linear fixture indicating the alignment position for the enclosure with respect to the linear fixture, and wherein the light detector is integrated into the enclosure.

5. The method of claim 1, wherein the light is directly detected by the light detector, and wherein the light detector is integrated into a particular location on the linear fixture and indicates the alignment position for the enclosure with respect to the linear fixture.

6. The method of claim 1, wherein the light is coherent light and the light source is a laser diode.

7. The method of claim 1, wherein the light is visible light and the light source is a light emitting diode.

8. An enclosure alignment system comprising:
   an enclosure to be aligned onto a linear fixture, the enclosure comprising:
      a LiDAR;
      a transparent cover encapsulating the enclosure, wherein the enclosure is linearly translatable along the linear fixture;
      a light source configured to emit light to be detected by a light detector; and
      the light detector, configured to measure the luminance of the light as the enclosure is being linearly translated along the linear fixture, wherein a particular location corresponding to a maximum luminance of the light is identified as an alignment position for the enclosure with respect to the linear fixture.

9. The system of claim 8, wherein the enclosure translates along the linear fixture in a linear direction until the maximum luminance of the light is detected by the light detector.

10. The system of claim 8, further comprising:
a display to display a visual indication of the luminance of the light detected by the light detector.

11. The system of claim 8, wherein the light reflects off from a reflective surface on the linear fixture at the particular location, and wherein the light detector is disposed at a base of the enclosure.

12. The system of claim 8, wherein the light is directly detected by the light detector, and the light detector is integrated into the particular location on the linear fixture.

13. The system of claim 8, wherein the light is coherent light and the light source is a laser diode.

14. The system of claim 8, wherein the light is visible light and the light source is a light emitting diode.

15. The method of claim 1, wherein the alignment position is determined based on historical luminance values, and the method furthering comprising:
indicating an alignment error when the maximum luminance of the light deviates from the historical luminance values.

16. The method of claim 1, further comprising:
emitting an audio cue when the alignment position is reached, wherein the audio cue varies in at least one of pitch or amplitude based on the luminance of the light, wherein the audio cue is based on sound profiles, or wherein the audio cue is discrete or continuous.

17. The method of claim 1, further comprising:
adjusting the maximum luminance based on an age of the light source.

18. The system of claim 9, wherein the alignment position for the enclosure with respect to the linear fixture is determined based on historical luminance values.

19. The system of claim 9, wherein the maximum luminance is adjusted based on an age of the light source.

20. The system of claim 10, wherein the display emits an audio cue when an alignment position is reached, and wherein the audio cue varies in at least one of pitch or amplitude based on the luminance of the light, wherein the audio cue is based on sound profiles, or wherein the audio cue is discrete or continuous.

* * * * *